United States Patent
Cina (10) Patent No.: US 7,775,248 B2
(45) Date of Patent: Aug. 17, 2010

(54) CYLNDRICAL CONTAINER SLEEVE FORMATION

(75) Inventor: Yaron Cina, Moshav Sarona (IL)

(73) Assignee: Polyraz Plastics Industries, Maoz Haim (IL)

(*) Notice: Subject to any disclaimer, the term of this patent is extended or adjusted under 35 U.S.C. 154(b) by 635 days.

(21) Appl. No.: 11/772,836

(22) Filed: Jul. 3, 2007

(65) Prior Publication Data

US 2009/0008037 A1 Jan. 8, 2009

(51) Int. Cl.
*B32B 37/00* (2006.01)
(52) U.S. Cl. .................... 156/425; 156/510
(58) Field of Classification Search ............... 156/184, 156/190, 191, 193, 195, 250, 425, 510
See application file for complete search history.

(56) References Cited

U.S. PATENT DOCUMENTS

| | | | |
|---|---|---|---|
| 2,785,700 A | 3/1957 | Yovanovich | |
| 3,478,627 A * | 11/1969 | Marion | 82/70.2 |
| 3,623,929 A | 11/1971 | Wannamaker et al. | |
| 4,778,440 A | 10/1988 | Burchette, Jr. | |
| 5,916,343 A * | 6/1999 | Huang et al. | 82/130 |
| 5,970,685 A * | 10/1999 | Huang | 83/597 |
| 6,502,488 B1 * | 1/2003 | Taylor | 82/130 |
| 7,343,842 B2 * | 3/2008 | Chen | 83/597 |
| 7,562,611 B2 * | 7/2009 | Chen | 83/597 |

FOREIGN PATENT DOCUMENTS

WO 2004/106017 12/2004

\* cited by examiner

*Primary Examiner*—Jeff H Aftergut
(74) *Attorney, Agent, or Firm*—Dekel Patent Ltd.; David Klein (57) ABSTRACT

A system including a supply roll of a laminate, a mandrel for wrapping the laminate therearound, feed rollers that spool the laminate off the supply roll onto the mandrel, the feed rollers being attached to a mounting plate by an adjustable bracket that sets an angle of the laminate with respect to the mandrel, adjacent windings of the laminate being joined to one another at overlaps thereof, wherein each winding of the laminate makes at least one complete revolution around the mandrel before the laminate advances to its next adjacent winding so as to form a seal at the overlaps of the adjacent windings, and a cutting station adapted to cut cylindrical tubes formed by windings of the laminate about the mandrel.

6 Claims, 8 Drawing Sheets

CYLNDRICAL CONTAINER SLEEVE FORMATION

FIELD OF THE INVENTION

The present invention relates generally to a novel method of formation of a gas barrier in containers, such as cans, and particularly to formation of a cylindrical container sleeve from sheet wrapped around a mandrel.

BACKGROUND OF THE INVENTION

The primary purpose of food packaging is to protect food against environmental contaminants. Each food category, e.g., frozen, chilled or those which are shelf stable at ambient temperatures, has different requirements. Generally, product processing must be integrated with the package to optimize shelf-life objective. Thus canned foods are both heated and hermetically sealed to exclude microbiological recontamination; dry foods are sealed against moisture access; frozen foods must be maintained at low temperatures and protected against moisture loss; and chilled foods are refrigerated while controlling the transmission of both moisture and air.

A variety of plastic materials is used for packaging depending on the food requirements, e.g., polyethylenes, polyesters, polypropylenes, polystyrenes, nylons, poly vinyl chlorides, etc. Among the structures employed are extrusion and injection blow-molded bottles, thermoformed trays and cast or blown films. High gas barrier plastics are coated, co-extruded, or laminated to structural plastics in order to enhance properties.

The oxidation of fats, oils, and other food components produces off-flavors, off-colors and nutrient loss. Thus, protection against oxygen is one of the most important requirements of food packaging. Common synthetic polyolefin films such as PE and PP are excellent moisture barriers, but they must be coated or laminated with synthetic polymers including EVOH copolymers to provide an oxygen barrier.

EVOH (Ethylene-Vinyl Alcohol) copolymer, is used in co-extruded plastic films to improve oxygen barrier properties. It is, however, a poor water vapor barrier. Even its otherwise excellent OTR (oxygen transmission rate) is sensitive to high humidity. Therefore, for packaging applications, EVOH is usually the core layer of co-extruded plastic films, where it is shielded from moisture by protective layers of polyethylene. Its OTR also depends on its VOH (vinyl alcohol) content.

Sealing is a large concern with high-barrier plastic containers. Plastic cans or bowls are typically double-seamed with a metal end. The seam is critical to the safety of the product.

There are many kinds of plastic containers that are made with different technologies. One family of containers is made of thin sheet formed into a tube shape. Such containers may be made from paper, cardboard, PVC, PET, acrylic, plastic and polythene. The containers can have all sorts of ends fittings, such as beaded, curled, metal seamed ends, ring pull closures, plugs, caps and many others.

SUMMARY OF THE INVENTION

The present invention seeks to provide a novel system for formation of a cylindrical container sleeve that offers improved gas barrier properties. This is achieved by wrapping a sheet around a mandrel and forming a seam impervious to gas flow therethrough, as is described hereinbelow.

There is thus provided in accordance with an embodiment of the present invention a system including a supply roll of a laminate, a mandrel for wrapping the laminate therearound, feed rollers that spool the laminate off the supply roll onto the mandrel, the feed rollers being attached to a mounting plate by an adjustable bracket that sets an angle of the laminate with respect to the mandrel, adjacent windings of the laminate being joined to one another at overlaps thereof, wherein each winding of the laminate makes at least one complete revolution around the mandrel before the laminate advances to its next adjacent winding so as to form a seal at the overlaps of the adjacent windings, and a cutting station adapted to cut cylindrical tubes formed by windings of the laminate about the mandrel.

Adjacent windings of the laminate may be joined by application of heat thereto from a heat source. A coining roller may be used to press against overlaps of adjacent windings of the laminate. The coining roller may be arranged to be at the same angle with respect to the mandrel as the adjustable bracket.

Regardless of the angle of the windings, the laminate meets itself around the mandrel, i.e., each winding of the laminate makes at least one complete revolution around the mandrel before the laminate advances to the next adjacent winding. Thus a gas (e.g., oxygen) barrier is formed at the overlap (seam) of the adjacent windings of the laminate.

In accordance with an embodiment of the present invention a controller controls and synchronizes operation of the system.

In accordance with an embodiment of the present invention the cutting station is axially moveable with respect to the mandrel. In this manner, the cutting station does not interfere with or interrupt the smooth flow of the laminate being wrapped around the mandrel.

In accordance with an embodiment of the present invention the cutting station includes a motor that drives a drive wheel, a cutting wheel, a plurality of cutting blades disposed in channels formed in the cutting wheel, and a solenoid operatively connected to the cutting wheel, wherein before cutting the cutting wheel turns together with the drive wheel and the cutting blades do not contact the laminate, and the solenoid is operative to arrest rotational movement of the cutting wheel so as to impart a centripetal force on the cutting blades, thereby thrusting them to contact and cut the laminate.

BRIEF DESCRIPTION OF THE DRAWINGS

The present invention will be understood and appreciated more fully from the following detailed description, taken in conjunction with the drawings in which:

FIGS. 8A-8C are simplified illustrations of wrappings of the container sleeve made by the system of FIG. 1, wherein

DETAILED DESCRIPTION OF EMBODIMENTS

Figure 1:
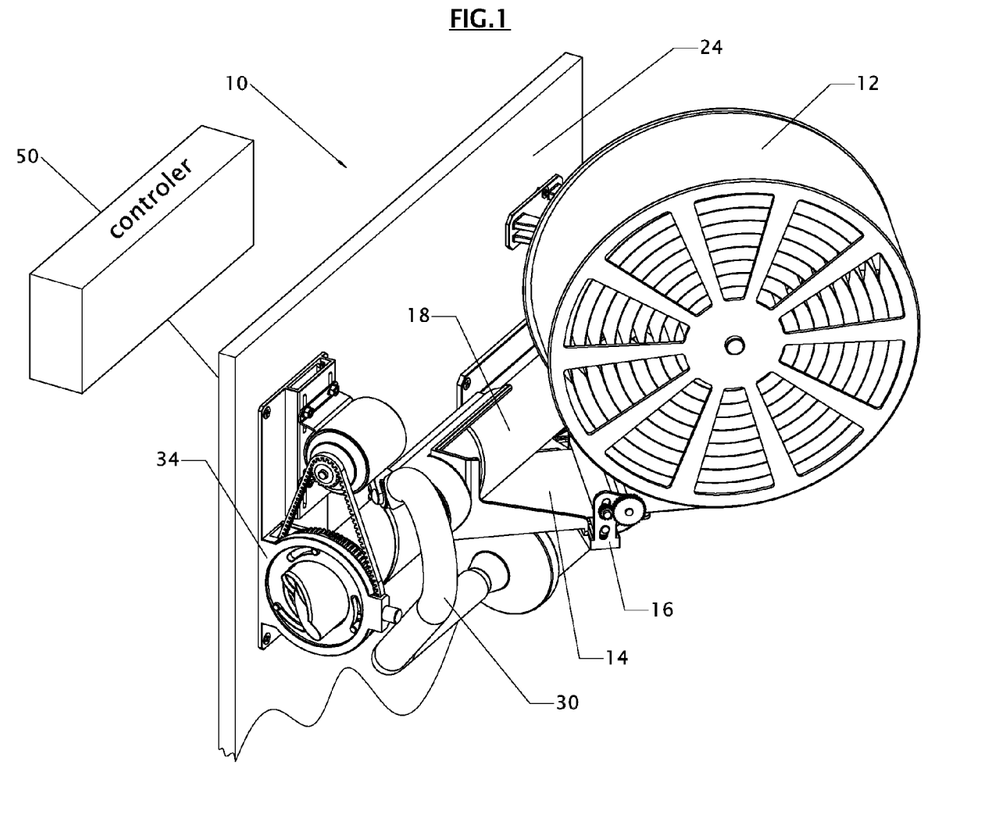
FIGS. 1, 2 and 3 are simplified upper perspective, top view and front perspective illustrations, respectively, of a system for formation of a cylindrical container sleeve, constructed and operative in accordance with an embodiment of the present invention.
Figure 2:
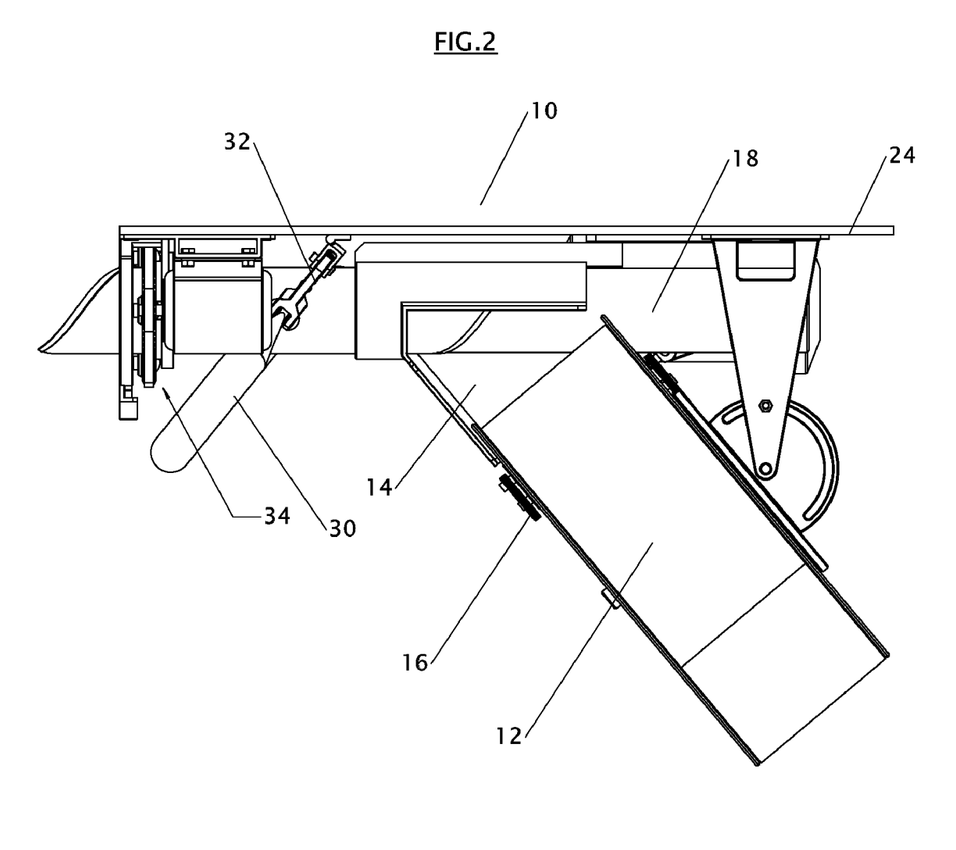
Figure 3:
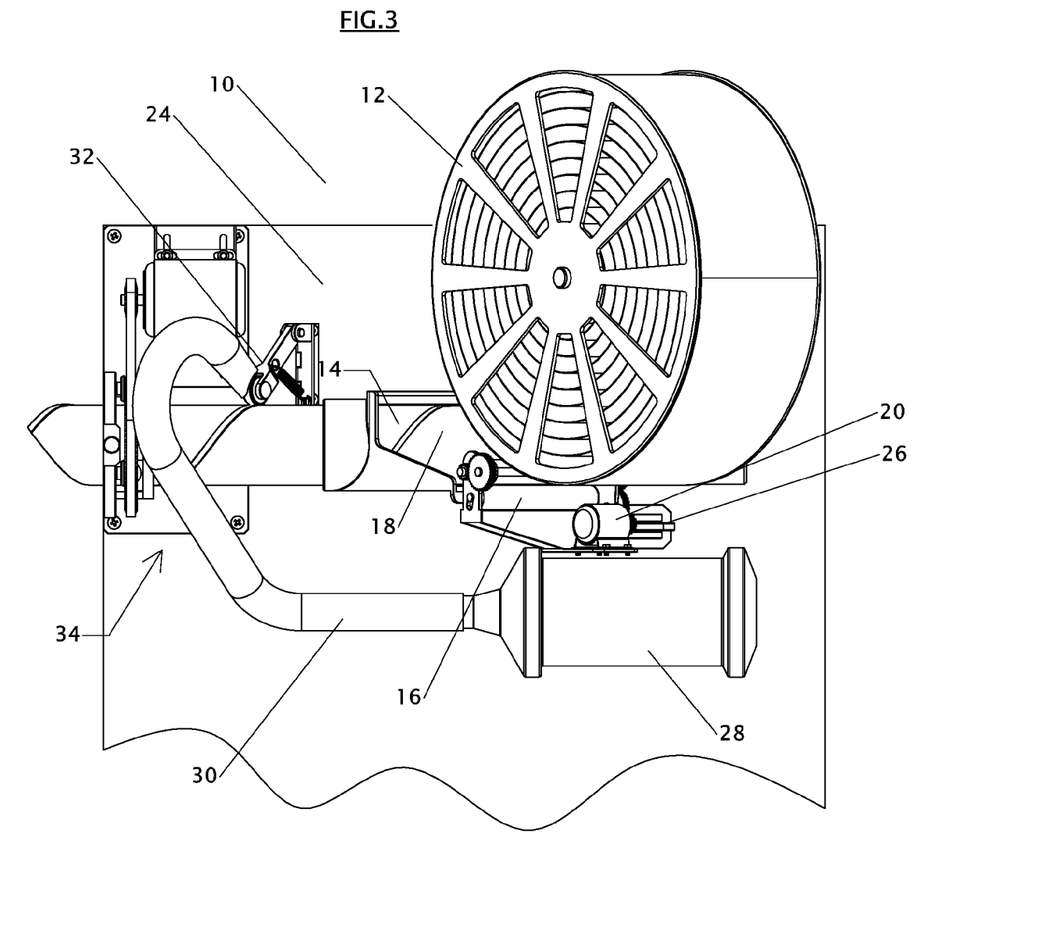

Reference is now made to FIGS. 1-3, which illustrate a system 10, constructed and operative in accordance with an embodiment of the present invention.

Figure 5:
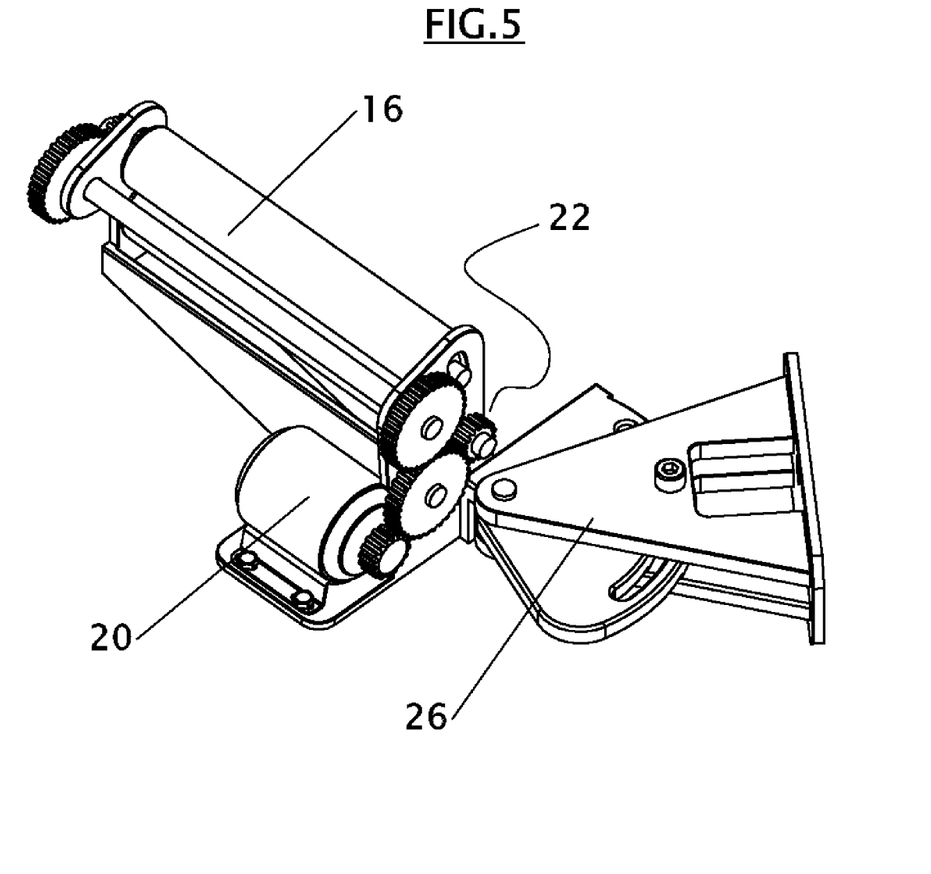
FIG. 5 is a simplified, more detailed pictorial illustration of feed rollers used to pay out sheet from a supply roll in the system of FIG. 1, constructed and operative in accordance with an embodiment of the present invention.

System 10 may include a supply roll 12 of a laminate 14. The term "laminate" throughout the specification and claims encompasses any material capable of being wrapped or wound and joined into a sleeve, such as but not limited to, sheet, film, ply or foil and the like, the terms being used interchangeably throughout the specification and the claims. Laminate 14 may be made of materials, such as but not limited to, plastic, paper or cardboard materials, metal foil and more. Laminate 14 is spooled off the supply roll 12 by means of feed rollers 16 (shown more in detail in FIG. 5) onto a mandrel 18. Feed rollers 16 may be turned by means of a gear motor 20 which is in geared connection with them via a gear train 22. Feed rollers 16 may be attached to a mounting plate 24 (FIGS. 1-3) by an adjustable bracket 26 (FIG. 5). The adjustable bracket 26 can be used to set the angle of the supply roll 12 and laminate 14 with respect to mandrel 18. This angle affects, among other things, the number of windings of laminate 14 per axial length along mandrel 18, which in turn affects structural integrity of the finished container sleeve, among other things.

Figure 8A:
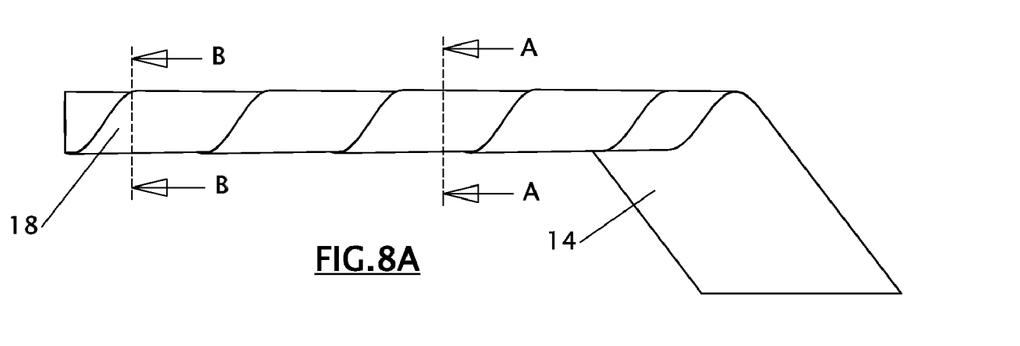
FIG. 8A is a pictorial illustration of the wrappings of the sleeve.
Figure 8B:
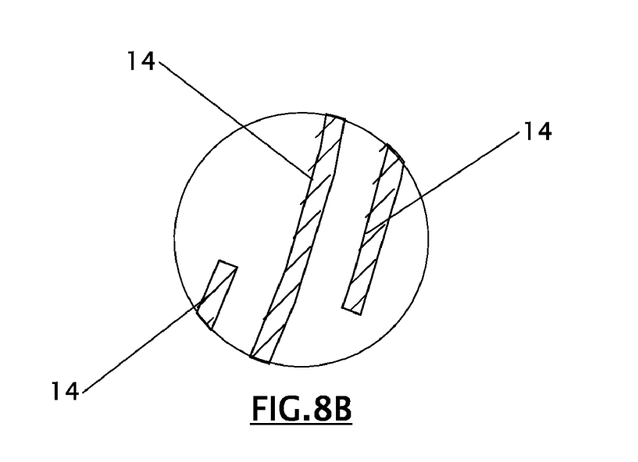
FIG. 8B is a sectional illustration of plies of the sleeve before joining (the separation between the plies being exaggerated in the figure for clarity purposes)
Figure 8C:
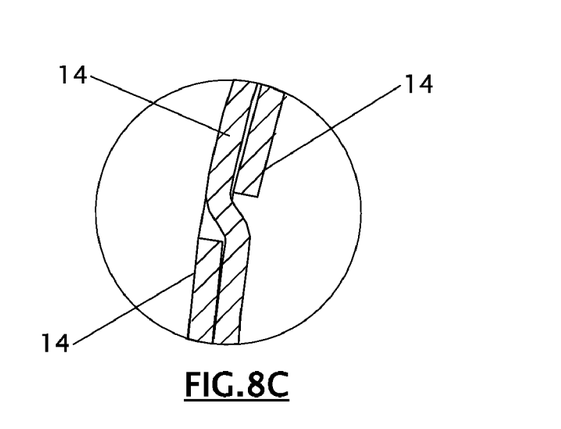
FIG. 8C is a sectional illustration of plies of the sleeve after joining.

Reference is now made to FIGS. 8A-8C, which illustrate wrappings of laminate 14. FIG. 8B is a sectional illustration of the plies before joining (the separation between the plies being exaggerated in the figure for clarity purposes). It is seen that regardless of the angle of the windings (as determined by the angle of bracket 26), the laminate 14 meets itself around the mandrel 18, i.e., each winding of the laminate 14 makes at least one complete revolution around the mandrel 18 before the laminate 14 advances to the next adjacent winding. As seen in FIG. 8C, after joining the plies (as described below), a gas (e.g., oxygen) barrier is formed at the overlap (seam) of the adjacent windings of the laminate 14. The gas seal is formed at the edges of the seam—it is not necessary to bond the entire width of each winding, rather it is sufficient to bond the overlap which is at the edges of the seam. A labyrinth is formed by the windings and overlap which seals the flow of gas (e.g., oxygen) therethrough.

Figure 4:
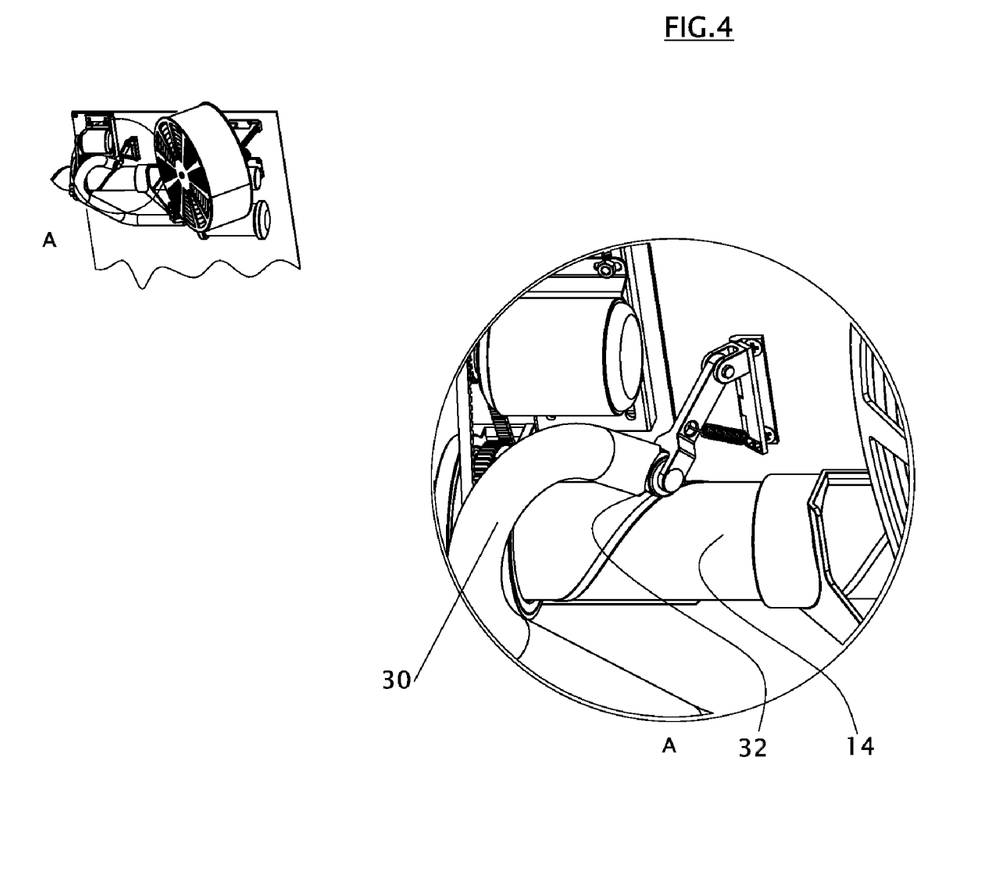
FIG. 4 is a simplified, more detailed pictorial illustration of a joining station in the system of FIG. 1, constructed and operative in accordance with an embodiment of the present invention.

Reference is now made again to FIGS. 1-3 and additionally to FIG. 4, which illustrate joining the windings of laminate 14 to each other. As used herein, the term "joined" encompasses configurations whereby an element is directly secured to another element by affixing the element to the other element (such as but not limited to, adhesives (including self-adhesives or adhesives such as hot melt glue applied by an applicator, not shown), heat and/or pressure, thermobonding, ultrasonics, welding, and others), or configurations whereby an element is indirectly secured to another element by affixing the element to an intermediate member or members which in turn are affixed to the other element (such as but not limited to, soldering, meltable adhesive sheet and others). In the non-limiting illustrated embodiment, the laminate windings are joined by application of heat from a heat source 28 (e.g., hot air blower). Heat is led from heat source 28 to the site of the joining by a tube 30. A coining roller 32 may press against the seam of the windings to ensure sound joining. The coining roller 32 is preferably arranged to be a matching angle as adjustable bracket 26 in order to follow the angle of the windings.

Figure 6A:
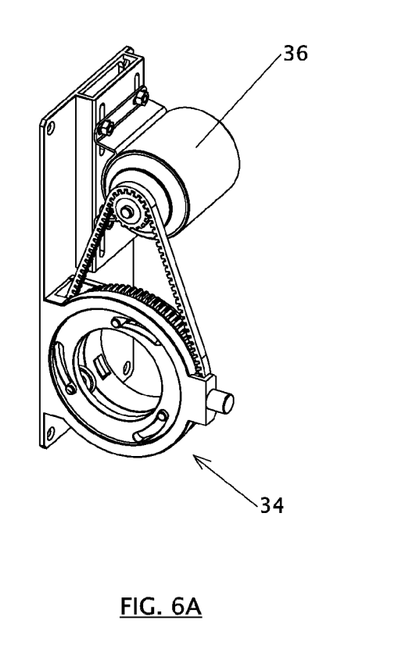
FIGS. 6A and 6B are simplified, more detailed pictorial illustration of a cutting station in the system of FIG. 1, constructed and operative in accordance with an embodiment of the present invention, respectively in non-cutting and cutting modes.
Figure 6B:
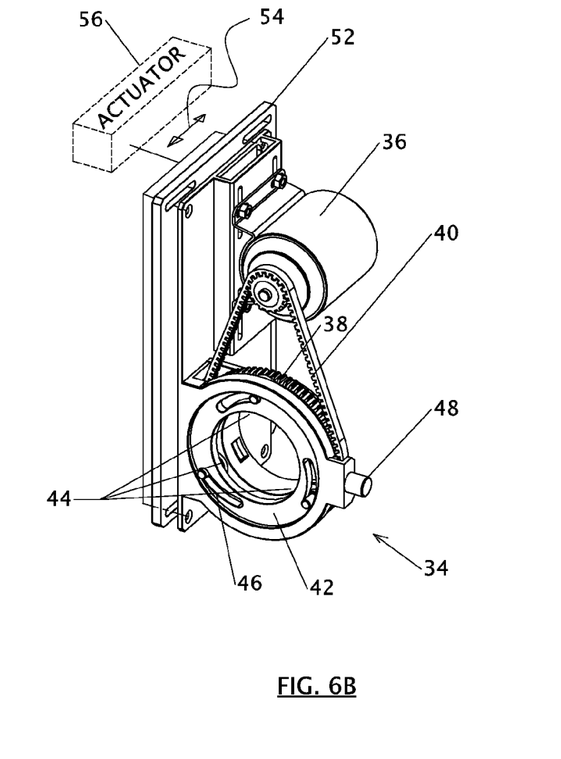

Reference is now made to FIGS. 6A and 6B, which illustrate a cutting station 34 of system 10, constructed and operative in accordance with an embodiment of the present invention, respectively in non-cutting and cutting modes. This is one type of cutting station and other methods for cutting may be used. In the non-limiting illustrated embodiment, cutting station 34 includes a motor 36 that drives a drive wheel 38 via a timing belt 40. A cutting wheel 42 normally turns together with the drive wheel 38. A plurality of cutting blades 44 are disposed in arcuate channels 46 formed in cutting wheel 42 (Three cutting blades 44 are shown in the non-limiting illustrated embodiment, but other numbers may be used.) A solenoid 48 is operatively connected to cutting wheel 42 and controls the frictional drive connection between cutting wheel 42 and drive wheel 38 (similar to a clutch). The cutting operation, as well as the operation of the rest of system 10, may be controlled and synchronized by a controller 50 (FIG. 1).

Before cutting (FIG. 6B), cutting wheel 42 turns together with drive wheel 38. The cutting blades 44 ride inside channels 46; cutting blades 44 do not protrude inwards and do not contact the laminate 14. In order to cut the laminate 14, controller 50 signals solenoid 48 to change the frictional drive connection on the cutting wheel 42, so that cutting wheel 42 does not turn with drive wheel 38. This change imparts a centripetal force on the cutting blades 44, thereby thrusting them towards the center of the turning axis and out of channels 46. The cutting blades 44 now contact and cut the laminate 14 as the mandrel 18 turns.

The cutting station 34 is preferably mounted on a track 52 so that cutting station 34 can be moved axially (as indicated by arrows 54) with respect to mandrel 18. In this manner, cutting station 34 does not interfere with or interrupt the smooth flow of the laminate 14 being wrapped around the mandrel 18. Cutting station 34 may be moved along track 52 by an actuator 56, such as but not limited to, a linear actuator, step motor and the like. Movement of cutting station 34 may be controlled and synchronized by controller 50.

Figure 7:
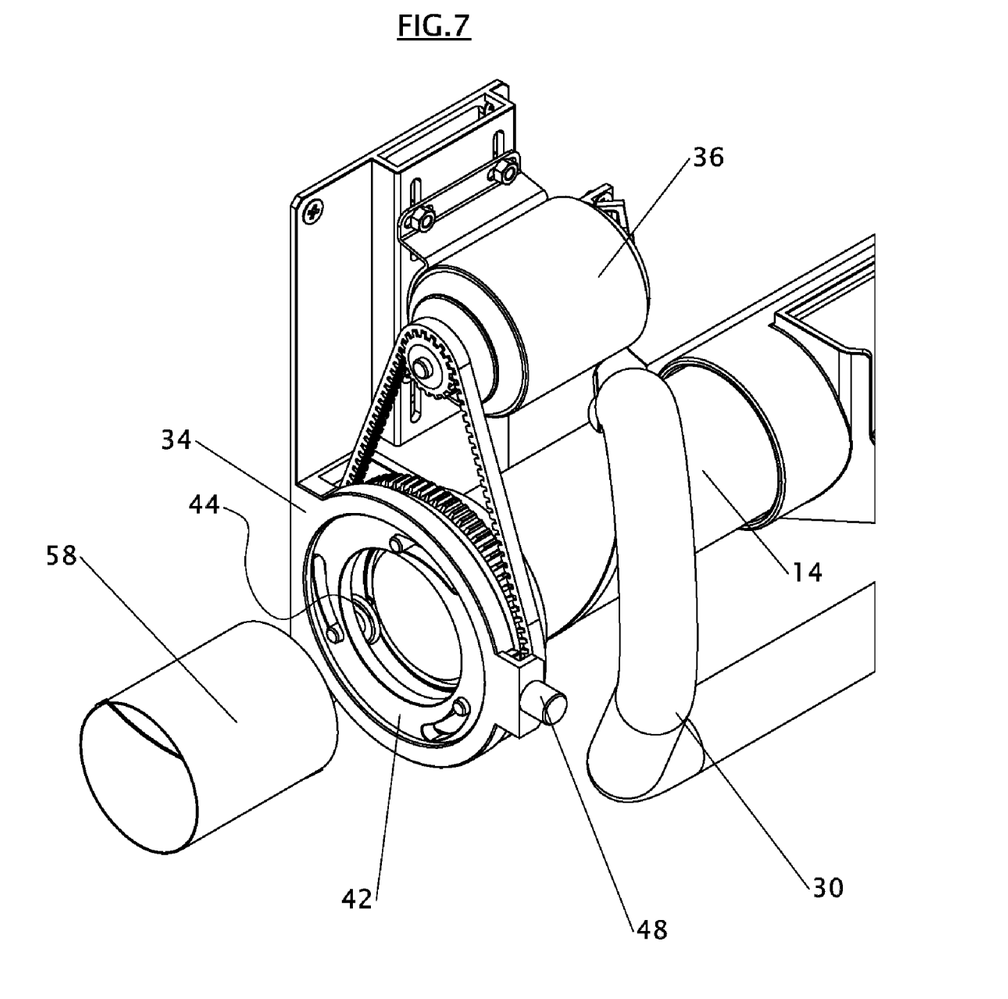
FIG. 7 is a simplified, more detailed pictorial illustration of a container sleeve that has been cut by the cutting station of the system of FIG. 1, in accordance with an embodiment of the present invention.

FIG. 7 illustrates a sleeve 58 that has been cut by cutting station 34, in accordance with an embodiment of the present invention. Sleeve 58 is not a finished container and lacks end fittings. Sleeve 58 is conveyed to another station for application of the end fittings (not shown).

The scope of the present invention includes both combinations and subcombinations of the features described hereinabove as well as modifications and variations thereof which would occur to a person of skill in the art upon reading the foregoing description and which are not in the prior art.

What is claimed is:

1. A system comprising:
   a supply roll of a laminate;
   a mandrel for wrapping said laminate therearound;
   feed rollers that spool said laminate off said supply roll onto said mandrel, said feed rollers being attached to a mounting plate by an adjustable bracket that sets an angle of said laminate with respect to said mandrel, adjacent windings of said laminate-being joined to one another at overlaps thereof, wherein each winding of said laminate makes at least one complete revolution around said mandrel before said laminate advances to its next adjacent winding so as to form a gas seal at the overlaps of the adjacent windings; and a cutting station adapted to cut cylindrical tubes formed by windings of said laminate about said mandrel, wherein said cutting station comprises:
- a motor that drives a drive wheel;
- a cutting wheel;
- a plurality of cutting blades disposed in channels formed in said cutting wheel; and
- a solenoid operatively connected to said cutting wheel, wherein before cutting said cutting wheel turns together with said drive wheel and said cutting blades do not contact said laminate, and said solenoid is operative to arrest rotational movement of said cutting wheel so as to impart a centripetal force on said cutting blades, thereby thrusting them to contact and cut said laminate.

2. The system according to claim 1, wherein adjacent windings of said laminate are joined by application of heat thereto from a heat source.

3. The system according to claim 1, further comprising a coining roller adapted to press against overlaps of adjacent windings of said laminate.

4. The system according to claim 3, wherein said coining roller is arranged to be at the same angle with respect to said mandrel as said adjustable bracket.

5. The system according to claim 1, further comprising a controller that controls and synchronizes operation of said system.

6. The system according to claim 1, wherein said cutting station is axially moveable with respect to said mandrel.

* * * * *